US008223667B2

(12) United States Patent
Duggan et al.

(10) Patent No.: US 8,223,667 B2
(45) Date of Patent: Jul. 17, 2012

(54) INFERRED DISCOVERY OF A DATA COMMUNICATIONS DEVICE

(75) Inventors: Matthew E. Duggan, Chertsey (GB); Daniel J. Martin, Pawling, NY (US); David M. Roberts, London (GB)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 11/761,191

(22) Filed: Jun. 11, 2007

(65) Prior Publication Data
US 2008/0304496 A1 Dec. 11, 2008

(51) Int. Cl.
*H04L 12/28* (2006.01)
*G06F 15/173* (2006.01)
(52) U.S. Cl. ......... 370/254; 370/392; 370/401; 709/223
(58) Field of Classification Search .................. 370/401, 370/392; 709/242, 223, 244
See application file for complete search history.

(56) References Cited

U.S. PATENT DOCUMENTS

| 5,909,549 | A * | 6/1999 | Compliment et al. ........ 709/223 |
| 6,744,739 | B2 | 6/2004 | Martin | |
| 2003/0043820 | A1 | 3/2003 | Goringe et al. | |
| 2003/0046427 | A1 | 3/2003 | Goringe et al. | |
| 2004/0039840 | A1 * | 2/2004 | Dispensa et al. ............... 709/242 |
| 2005/0021737 | A1 | 1/2005 | Ellison et al. | |
| 2005/0050225 | A1 * | 3/2005 | Tatman ......................... 709/244 |
| 2005/0091482 | A1 | 4/2005 | Gray et al. | |
| 2006/0050888 | A1 | 3/2006 | Svensson | |

OTHER PUBLICATIONS

PCT Search Report, Nov. 8, 2008; PCT Application No. PCT/EP2008/056736.
Rekhter, et al.; "A Border Gateway Protocol 4 (BGP-4); rfc2471.txt" IETF Standard, Internet Engineering Task Force, IETF, Ch, Jan. 1, 2006, XP015054920 ISSN: 0000-0003 Chapters 1, 3, 4, 9.
Meyer:; "BGP Communities for Data Collection; rfc4384.txt" IETF Standard, Internet Engineering Task Force, IETF, Ch, Feb. 1, 2006, XP015044816 ISSN: 0000-0003 abstract Chapters 1-4.
International Search Report and Written Opinion dated Aug. 11, 2008 for International Application No. PCT/EP2008/056736, 12 pages.

* cited by examiner

*Primary Examiner* — Melanie Jagannathan
(74) *Attorney, Agent, or Firm* — Steven J. Walder, Jr.; Jeffrey S. LaBaw

(57) ABSTRACT

Mechanisms for inferred discovery of a data communication device connected to a router, unreachable by a management module, and characterized by a device address are disclosed. The mechanisms include querying, by the management module, the router for connection data and identifying, by the management module in dependence upon the connection data, the device address.

21 Claims, 4 Drawing Sheets

INFERRED DISCOVERY OF A DATA COMMUNICATIONS DEVICE

BACKGROUND OF THE INVENTION

1. Field of the Invention

The field of the invention is data processing, or, more specifically, methods, apparatus, and products for inferred discovery of a data communications device.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in inferred discovery of a data communications device. In multiprotocol label switching, layer 3, virtual private networks ('L3VPN'), a data communications device, such as a customer edge router is only reachable from a management module for the purpose of discovery if that management module and the customer edge router are members of the same VPN. Because it is inefficient to create a new management module for each VPN that is managed by a single entity, management modules are often members of multiple VPNs. A management module that is a member of multiple VPNs is a security risk. Another problem created by having a management module be a member of multiple VPNs is that customer edge routers in different VPNs may use the same IP address. A management module that is a member of multiple VPNs may encounter difficulty in distinguishing between data communications from two customer edge routers having the same IP address.

In addition to customer edge routers in L3VPNs, other data communications devices are unreachable by a management module, such as, External Border Gateway Protocol ('EBGP') speakers in networks belonging to other providers. An EBGP speaker exchanges routing information between autonomous systems. An autonomous system is a collection of Internet Protocol networks and routers, typically under the control of a single entity, that presents a common routing policy to the internet. Attempts to discover an EGBP speaker outside of the autonomous system managed by the management module, by Internet Control Message Protocol ('ICMP') echo requests, for example, may be viewed by the owner of the EGBP speaker as a hostile act or a denial of service attack.

SUMMARY OF THE INVENTION

Methods, apparatus, and products for inferred discovery of a data communications device connected to a router, unreachable by a management module, and characterized by a device address are disclosed that include querying, by the management module, the router for connection data and identifying, by the management module in dependence upon the connection data, the device address.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
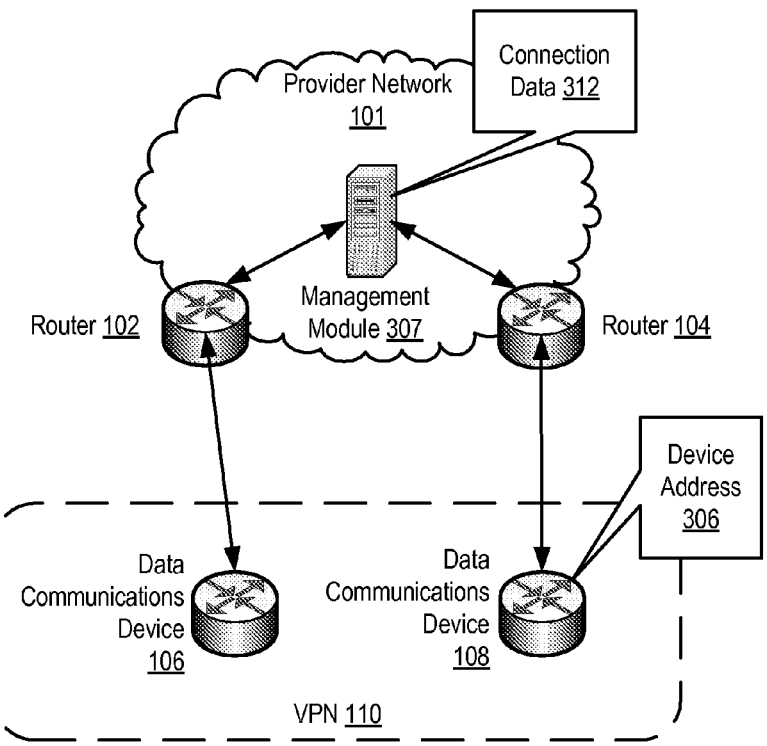
FIG. 1 sets forth a network diagram of a system for inferred discovery of a data communications device according to embodiments of the present invention.
Figure 1:
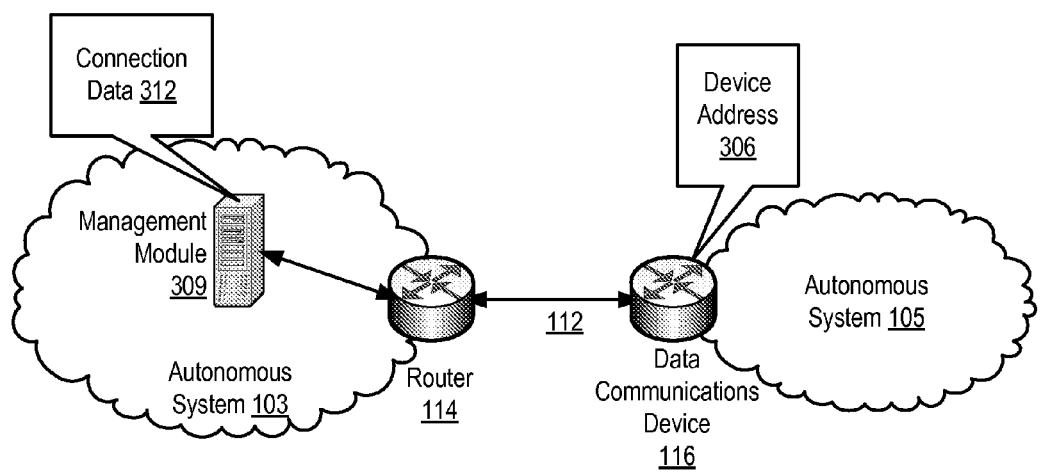

Exemplary methods, apparatus, and products for inferred discovery of a data communications device in accordance with the present invention are described with reference to the accompanying drawings, beginning with FIG. 1. FIG. 1 sets forth a network diagram of a system for inferred discovery of a data communications device according to embodiments of the present invention. The system of FIG. 1 includes data communications device (106, 108, 116). Each data communications device is connected to a router (102, 104, 114) and each data communications device is characterized by a device address (306). A device address is an address that can be used by a management module to identify and monitor a data communications device, such as for example, an IP address. Data communications devices capable of inferred discovery in accordance with embodiments of the present invention may be implemented as any device capable of data communications with a router, such as, for example another router. In the system of FIG. 1, each data communications device (106, 108, and 116) is unreachable by a management module.

The data communications devices (106, 108) are part of a virtual private network ('VPN') (110) connected to network (101). A VPN is a private communications network used to communicate confidentially over a public network. Each data communications device (106, 108) may be implemented as a customer edge router. A customer edge router is the router located at a customer site that is connected to a provider's core network. Each router (102, 104) connected to the data communications devices may be implemented as a provider edge router. A provider edge router is a router located in the core of the provider network that connects to a provider edge router.

The data communications device (116) is part of an autonomous system (105). An autonomous system is a collection of Internet Protocol networks and routers, typically under the control of a single entity, that presents a common routing policy to the internet. Autonomous systems may exchange routing information between one another through the use of the external border gateway protocol ('EBGP'). Routers that exchange such routing information between autonomous systems are EBGP speakers. The data communications device (116) and the router (114) in the system of FIG. 1 may be implemented as EBGP speakers.

The system of FIG. 1 also includes management modules (307, 309) that implement inferred discovery of a data communications device in accordance with embodiments of the present invention. Management module (307) is part of the provider network (101). Management module (307) may be configured to manage any devices within the provider network (101). Management module (309) is located within autonomous system (103). Management module (309) may be configured to manage the network connectivity of any device within the autonomous system (103). Each management module (307, 309) implements inferred discovery of a data communications device by querying a router (102, 114) for connection data (312) and identifying, in dependence upon the connection data (312), the device address. Connection data may be implemented as a forwarding table that includes an interface address of an interface of a router or as a management information base containing information describing devices in an autonomous system that is not managed by the management module.

The arrangement of routers, management modules, and other data communications devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Inferred discovery of a data communications device in accordance with the present invention is generally implemented with computers, that is, with automated computing machinery. In the system of FIG. 1, for example, the management module is implemented to some extent as a computer. For further explanation, therefore, FIG. 2 sets forth a block diagram of automated computing machinery comprising an exemplary computer (152) useful in inferred discovery of a data communications device according to embodiments of the present invention. The computer (152) of FIG. 2 includes at least one computer processor (156) or 'CPU' as well as random access memory (168) ('RAM') which is connected through a system bus (160) to processor (156) and to other components of the computer.

Figure 2:
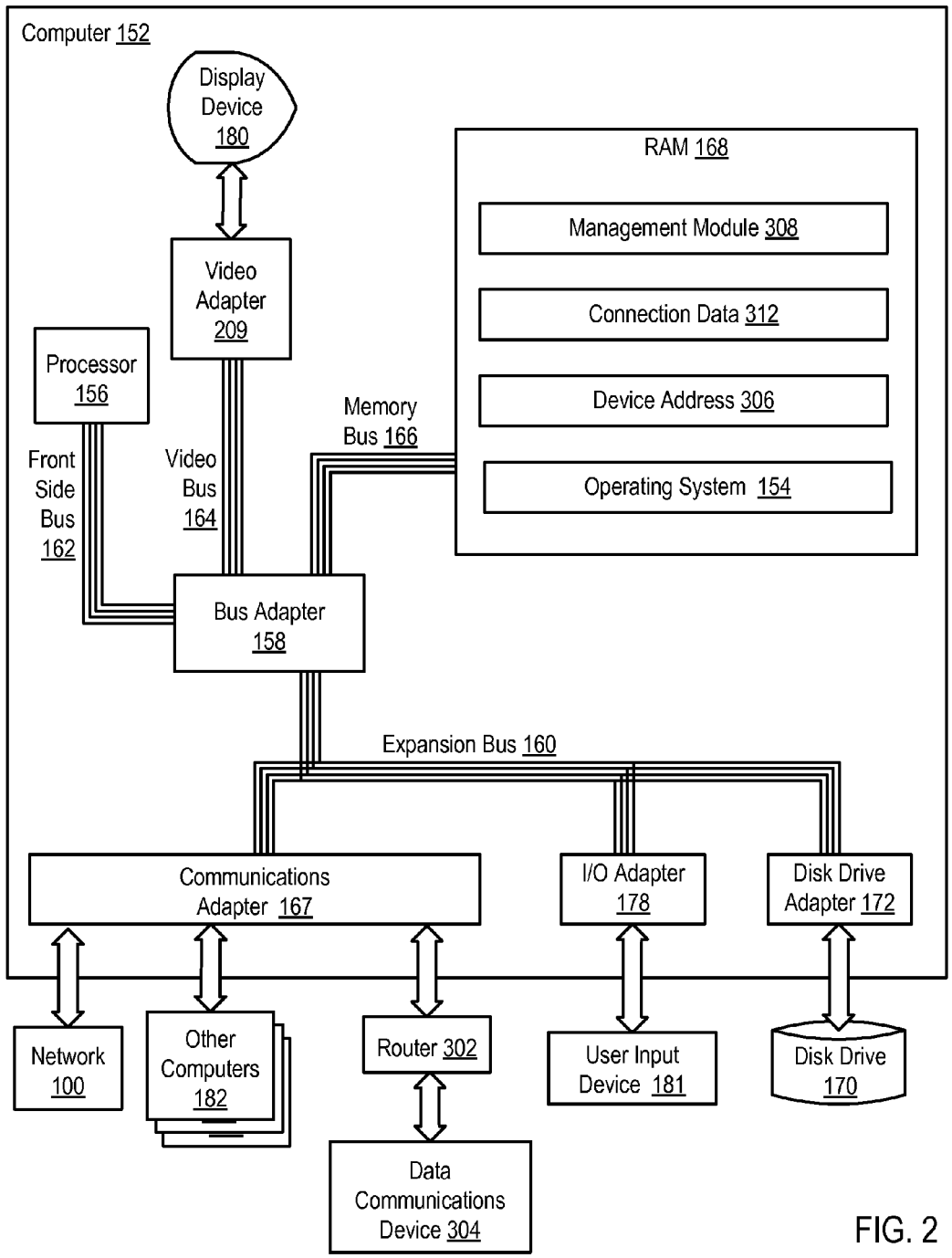
FIG. 2 sets forth a block diagram of automated computing machinery comprising an exemplary computer useful in inferred discovery of a data communications device according to embodiments of the present invention.

Stored in RAM (168) is a management module (308), a module of computer program instructions for inferred discovery of a data communications device according to embodiments of the present invention. The data communications device (304) of FIG. 2 is connected to the router (302), is characterized by a device address (306), and is unreachable by the management module (308). The exemplary management module (308) of FIG. 2 queries the router (302) for connection data (312). The management module (308) also identifies, in dependence upon the connection data (312), the device address (306).

Also stored in RAM (168) is an operating system (154). Operating systems useful in computers according to embodiments of the present invention include UNIX™, Linux™, Microsoft Vista™, Microsoft XP™, AIX™, IBM's i5/OS™, and others as will occur to those of skill in the art. Operating system (154), management module (308), connection data (312), and device address (306) in the example of FIG. 2 are shown in RAM (168), but many components of such software typically are stored in non-volatile memory also, for example, on a disk drive (170).

The computer (152) of FIG. 2 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful for inferred discovery of a data communications device according to embodiments of the present invention include the Intel Northbridge, the Intel Memory Controller Hub, the Intel Southbridge, and the Intel I/O Controller Hub. Examples of expansion buses useful for inferred discovery of a data communications device according to embodiments of the present invention include Industry Standard Architecture ('ISA') buses and Peripheral Component Interconnect ('PCI') buses.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for inferred discovery of a data communications device according to embodiments of the present invention include modems for wired dial-up communications, Ethernet (IEEE 802.3) adapters for wired data communications network communications, and 802.11 adapters for wireless data communications network communications.

Figure 3:
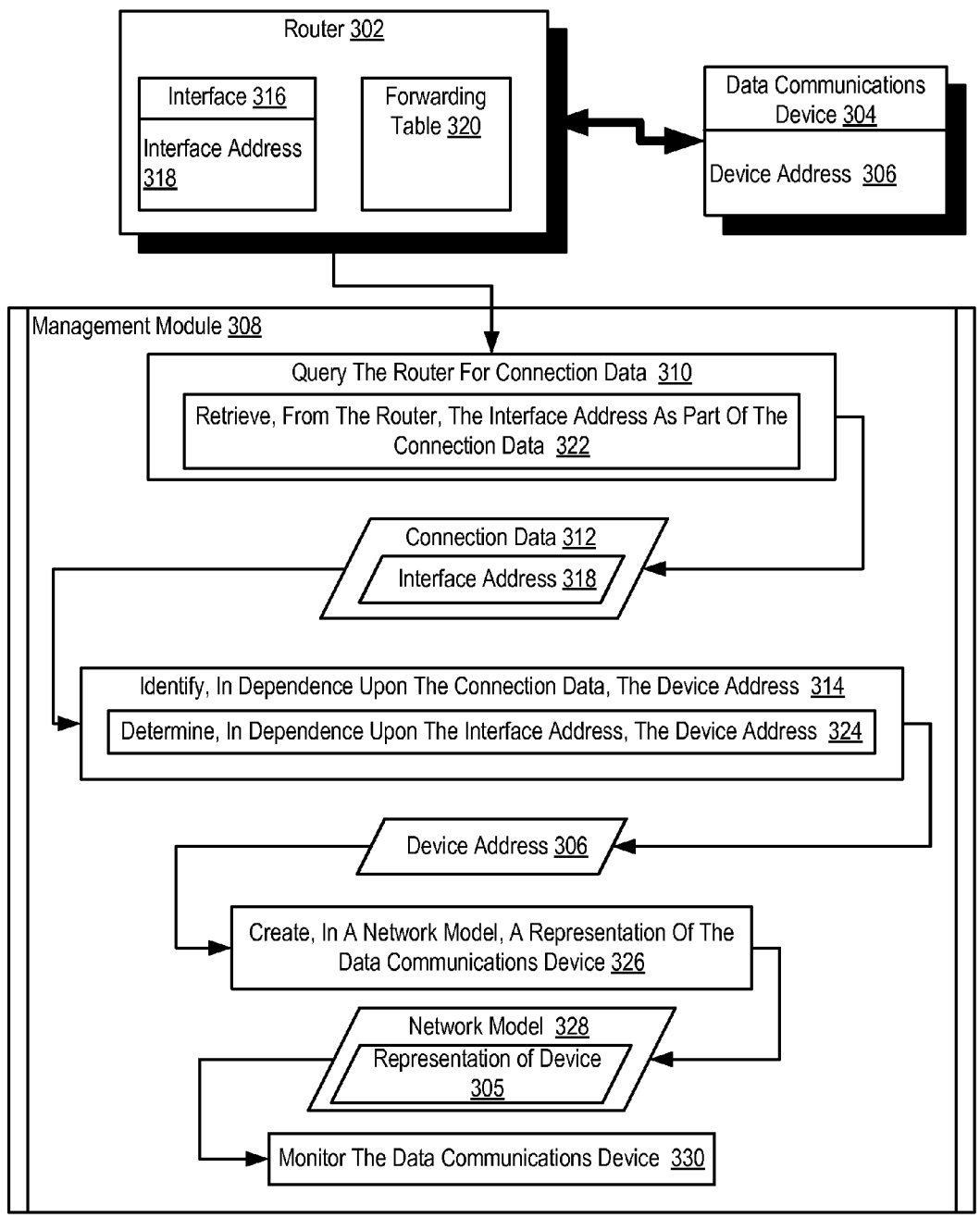
FIG. 3 sets forth a flow chart illustrating an exemplary method for inferred discovery of a data communications device according to embodiments of the present invention.

For further explanation, FIG. 3 sets forth a flow chart illustrating an exemplary method for inferred discovery of a data communications device according to embodiments of the present invention. In the method of FIG. 3, the data communications device (304) is connected to a router (302) and is characterized by a device address (306). Data communications devices capable of inferred discovery may be implemented as any device capable of data communications with router (302), such as, for example another router. In the method of FIG. 3, the data communications device (304) is unreachable by a management module (308).

In the method of FIG. 3, the router (302) includes a forwarding table (320). The forwarding table (320) is an instance of virtual routing and forwarding ('VRF'). A VRF instance includes information describing the topology of a network. The router (302) uses the forwarding table (320) to forward data communications packets by matching a destination address to the network paths used to reach the destination address. In multiprotocol label switching, layer 3, virtual private networks ('L3VPN'), for example, the router (302) supports multiple forwarding tables. Each forwarding table is associated with a single VPN.

In the method of FIG. 3, the router (302) is characterized by an interface (316) associated with the forwarding table. An interface is a connection point between a data communications device and a router. Examples of interfaces include Ethernet, Fast Ethernet, Gigabit Ethernet, optical fiber, and others will occur to those of skill in the art. The interface (316) in FIG. 3 is characterized by an interface address (318) having a/30 subnet mask. An interface address may be implemented as a logical address, such as an internet protocol ('IP') address. An IP address has two components, the network address and the host address. A subnet mask is a mask used to determine the subnet, the network address, to which an IP address belongs. A subnet mask consists of a series of 1s in binary followed by a series of 0s. The 1s designate the part of the IP address that is the host address, and the 0s designate the part of the IP address that is the network address. The subnet mask is used in conjunction with the IP address to determine which part of the IP address is the network address and which part is the host address. A subnet masks may be expressed in various ways such as, for example, in dot-decimal form, binary, or classless inter-domain routing ('CIDR') notation. A/30 subnet mask is the CIDR notation equivalent to 225.255.255.252, in dot-decimal form, or 11111111.11111111.11111111.11111100, in binary. Each subnet includes two IP addresses that are reserved, the network identification address and the broadcast address. In a subnet having a/30 subnet mask, there are four host addresses, with two addresses being reserved, leaving only two available host addresses. The reserved addresses, in binary, end in 11, and 00 and the available address end in 10 and 01.

The method of FIG. 3 includes querying (310), by the management module (308), the router (302) for connection data (312). In the method of FIG. 3 querying (310) the router (302) for connection data (312) is carried out by retrieving (322), by the management module (308) from the router (302), the interface address (318) as part of the connection data (318). The management module (308) may retrieve the interface address (318) by retrieving the interface address from a memory location, that is, the management module may be configured with the interface address. Other ways of retrieving the interface address may include pinging the router for the interface address, running a traceroute on the router, or other ways as will occur to those of skill in art.

The method of FIG. 3 also includes identifying (314), by the management module (308) in dependence upon the connection data (322), the device address (306). In the method of FIG. 3, identifying (314) the device address (306) is carried out by determining (324), by the management module (308) in dependence upon the interface address (318), the device address (306). As explained above, in a/30 subnet, only two host addresses are available. The management module (308) may determine the device address (306) by inverting the last two bits of the binary interface address. If the last two bits of the interface address, in binary, are 10, then the device address ends in 01. Consider as an example, the interface address 192.168.1.2 having a/30 subnet mask. The reserved network identification address is 192.168.1.0, and the reserved broadcast address is 192.168.1.3. The interface address 192.168.1.2 in binary ends in 10. Inverting the last two bits of the interface address results in a device address ending 01. That is, the device address for a/30 subnet, with an interface address of 192.168.1.2, is 192.168.1.1. The management module (308) may also determine the device address by finding in a lookup table, the only address that is unknown, that is, eliminating the three known addresses, the broadcast address, the network identification address, and the interface address. Readers of skill in the art will immediately recognize other ways of determining device address in accordance with embodiments of the present invention.

The method of FIG. 3 also includes creating (326), in a network model (328) by the management module (308), a representation (305) of the data communications device (304). A network model is a representation of network topology. Network models useful for inferred discovery of data communications devices may be used to collect and distribute data communications and build and maintain knowledge about physical and logical network connectivity. The management module (308) may create, in the network model, a representation of the data communications device by defining in the network model the device address and a connection between the data communications device and the interface.

The method of FIG. 3 also includes monitoring (330), by the management module (308), the data communications device (304). The management module may monitor the data communication device by, for example, using the network model to collect and distribute data communications between the router and the data communications device, and other ways as will occur to those of skill in the art.

Figure 4:
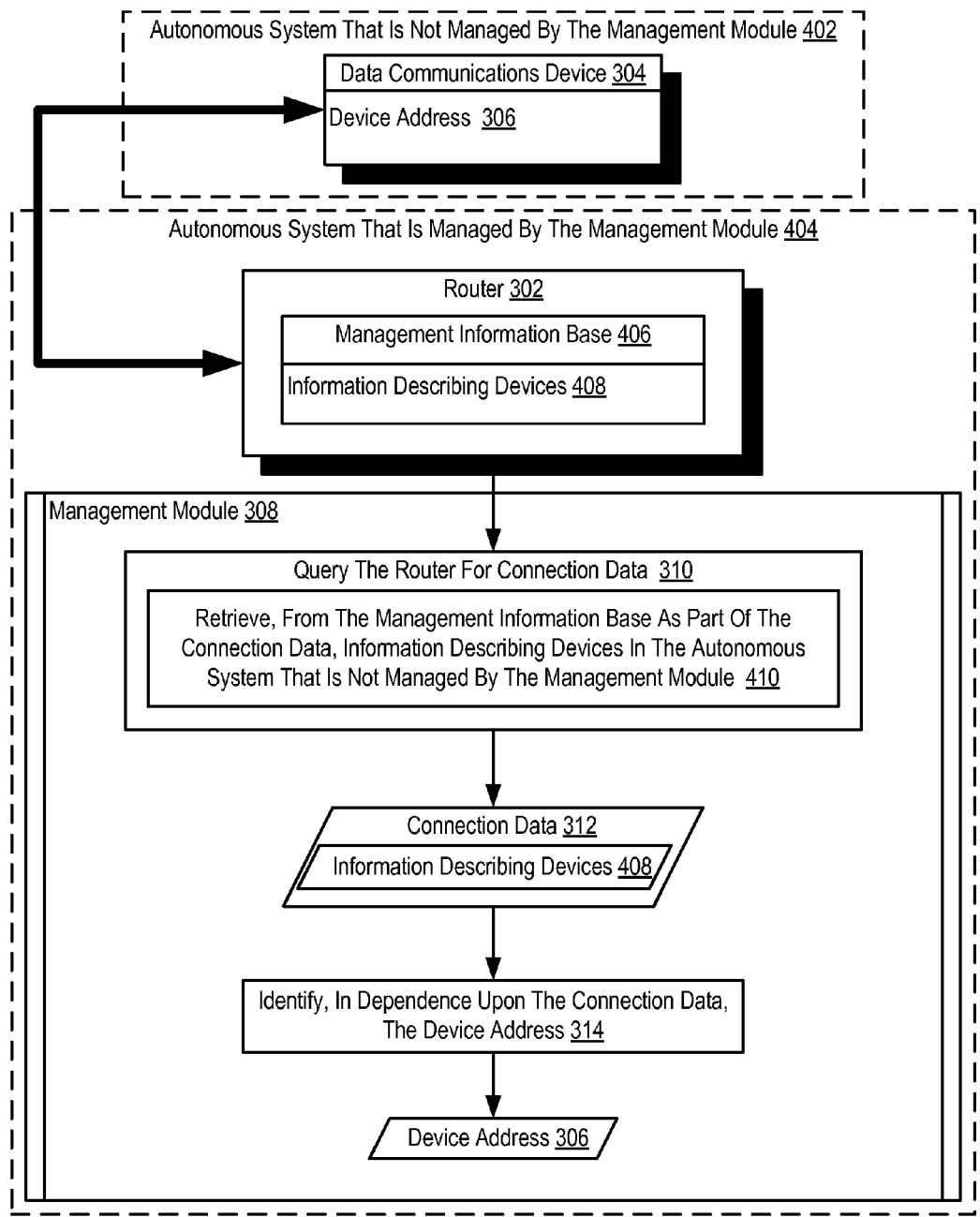
FIG. 4 sets forth a flow chart illustrating a further exemplary method for inferred discovery of a data communications device according to embodiments of the present invention.

For further explanation, FIG. 4 sets forth a flow chart illustrating a further exemplary method for inferred discovery of a data communications device according to embodiments of the present invention. The method of FIG. 4 is similar to the method of FIG. 3 including as it does the management module's (308) querying (310) the router (302) for connection data (312) and the management module's (308) identifying (314) the device address (306). In the method of FIG. 4, however, the router (302) is part of an autonomous system (404) that is managed by the management module (308) and the data communications device (304) is part of an autonomous system (402) that is not managed by the management module (302). An autonomous system is a collection of Internet Protocol networks and routers, typically under the control of a single entity, that presents a common routing policy to the internet. Autonomous systems may exchange routing information between one another through the use of the external border gateway protocol ('EBGP'). Routers that exchange such routing information between autonomous systems are EBGP speakers. Data communications devices and the routers useful in inferred discovery of a data communications device may be implemented as EBGP speakers.

In the method of FIG. 4 the exemplary router also includes a management information base (406) that includes information (408) describing devices in the autonomous system (402) that is not managed by the management module. A management information base ('MIB') is a collection of managed objects residing in a virtual information store. Information (408) describing devices in the autonomous system (402) that is not managed by the management module may include the device address (406) as well as other information as will occur to those of skill in the art. In the method of FIG. 4, querying (310) the router (302) for connection data (312) is carried out by retrieving (410), by the management module (308) from the management information base (406) as part of the connection data (312), information (408) describing devices in the autonomous system that is not managed by the management module.

Exemplary embodiments of the present invention are described largely in the context of a fully functional computer system for inferred discovery of a data communications device. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of inferred discovery of a data communications device connected to a router, unreachable by a management module, and characterized by a device address, the method comprising:
    querying, by the management module, the router for connection data, wherein the connection data includes an interface address of an interface of the router; and
    determining, by the management module in dependence upon the connection data, the device address, wherein the device address is logically derived using the interface address by inverting bits of the interface address.

2. The method of claim 1 wherein the router is a provider edge router and the data communications device is a customer edge router.

3. The method of claim 1 wherein the router is part of an autonomous system that is managed by the management module, the data communications device is part of an autonomous system that is not managed by the management module, the router further comprises a management information base that includes information describing devices in the autonomous system that is not managed by the management module.

4. The method of claim 3 wherein the router is an EBGP speaker and the data communications device is an EBGP speaker.

5. The method of claim 1 further comprises:
    creating, in a network model by the management module, a representation of the data communications device; and
    monitoring, by the management module, the data communications device.

6. The method of claim 1 wherein:
    the router comprises a forwarding table and an interface associated with the forwarding table, the interface characterized by an interface address, the interface address characterized by a /30 subnet mask;
    querying the router for connection data further comprises retrieving, by the management module from the router, the interface address as part of the connection data; and
    determining, in dependence upon the connection data, the device address further comprises determining, by the management module in dependence upon the interface address, the device address.

7. The method of claim 1 wherein the device address is logically derived using the interface address by identifying, from a group of possible device addresses, an address that is not in a lookup table.

8. Apparatus for inferred discovery of a data communications device data communications device connected to a router, unreachable by a management module, and characterized by a device address, the apparatus comprising a computer processor, a computer memory operatively coupled to the computer processor, the computer memory having disposed within it computer program instructions, wherein the computer program instructions, when executed by the computer processor, are capable of:
    querying, by the management module, the router for connection data, wherein the connection data includes an interface address of an interface of the router; and
    determining, by the management module in dependence upon the connection data, the device address, wherein the device address is logically derived using the interface address by inverting bits of the interface address.

9. The apparatus of claim 8 wherein the router is a provider edge router and the data communications device is a customer edge router.

10. The apparatus of claim 8 wherein the router is part of an autonomous system that is managed by the management module, the data communications device is part of an autonomous system that is not managed by the management module, the router further comprises a management information base that includes information describing devices in the autonomous system that is not managed by the management module; and
    querying the router for connection data further comprises:
    retrieving, by the management module from the management information base as part of the connection data, information describing devices in the autonomous system that is not managed by the management module.

11. The apparatus of claim 10 wherein the router is an EBGP speaker and the data communications device is an EBGP speaker.

12. The apparatus of claim 8 further comprises computer program instructions that, when executed by the computer processor, are capable of:
    creating, in a network model by the management module, a representation of the data communications device; and monitoring, by the management module, the data communications device.

13. The apparatus of claim 8 wherein:
the router comprises a forwarding table and an interface associated with the forwarding table, the interface characterized by an interface address, the interface address characterized by a /30 subnet mask;
querying the router for connection data further comprises retrieving, by the management module from the router, the interface address as part of the connection data; and
determining, in dependence upon the connection data, the device address further comprises determining, by the management module in dependence upon the interface address, the device address.

14. The apparatus of claim 8 wherein the device address is logically derived using the interface address by identifying, from a group of possible device addresses, an address that is not in a lookup table.

15. A computer program product for inferred discovery of a data communications device connected to a router, unreachable by a management module, and characterized by a device address, the computer program product disposed in a non-transitory computer readable, recordable medium, the computer program product comprising computer program instructions, that when executed by a computer processor, are capable of:
querying, by the management module, the router for connection data, wherein the connection data includes an interface address of an interlace of the router; and
determining by the management module in dependence upon the connection data, the device address, wherein the device address is logically derived using the interface address by inverting bits of the interface address.

16. The computer program product of claim 15 wherein the router is a provider edge router and the data communications device is a customer edge router.

17. The computer program product of claim 15 wherein the router is part of an autonomous system that is managed by the management module, the data communications device is part of an autonomous system that is not managed by the management module, the router further comprises a management information base that includes information describing devices in the autonomous system that is not managed by the management module; and
querying the router for connection data further comprises:
retrieving, by the management module from the management information base as part of the connection data, information describing devices in the autonomous system that is not managed by the management module.

18. The computer program product of claim 17 wherein the router is an EBGP speaker and the data communications device is an EBGP speaker.

19. The computer program product of claim 15 further comprises computer program instructions that, when executed by the computer processor, are capable of:
creating, in a network model by the management module, a representation of the data communications device; and
monitoring, by the management module, the data communications device.

20. The computer program product of claim 15 wherein:
the router comprises a forwarding table and an interface associated with the forwarding table, the interface characterized by an interface address, the interface address characterized by a /30 subnet mask;
querying the router for connection data further comprises retrieving, by the management module from the router, the interface address as part of the connection data; and
determining, in dependence upon the connection data, the device address further comprises determining, by the management module in dependence upon the interface address, the device address.

21. The computer program product of claim 15 wherein the device address is logically derived using the interface address by identifying, from a group of possible device addresses, an address that is not in a lookup table.

* * * * *